(12) United States Patent
Tomita et al.

(10) Patent No.: US 6,889,563 B2
(45) Date of Patent: May 10, 2005

(54) POSITION MEASURING DEVICE USING CHANGE IN INDUCTANCE OF COIL, FLOAT-TYPE FLOWMETER, AND POSITION MEASURING METHOD

(75) Inventors: Seiji Tomita, Yokosuka (JP); Setsuro Kawasaki, Yokosuka (JP); Motohiro Sotome, Ayase (JP); Tsuyoshi Watanabe, Fujisawa (JP)

(73) Assignee: SMC Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/454,475

(22) Filed: Jun. 5, 2003

(65) Prior Publication Data

US 2003/0226407 A1 Dec. 11, 2003

(30) Foreign Application Priority Data

Jun. 7, 2002 (JP) ........................................ 2002-166514

(51) Int. Cl.[7] ............................................... G01F 1/22
(52) U.S. Cl. ................................................... 73/861.57
(58) Field of Search ......................... 73/861.57, 290 R, 73/308, 314

(56) References Cited

U.S. PATENT DOCUMENTS 3,777,255 A  * 12/1973 Young et al. ........... 324/207.17
4,255,975 A  *  3/1981 Debreuille ................... 73/784
5,210,491 A  *  5/1993 Hachtel et al. ........ 324/207.19

FOREIGN PATENT DOCUMENTS

| CH | 575 115 | 4/1976 | |
|---|---|---|---|
| DE | 33 03 994 | 8/1983 | |
| DE | 41 28 159 | 2/1993 | |
| DE | 43 01 239 | 7/1994 | |
| DE | 100 16 540 | 7/2001 | |
| FR | 1 144 347 | 10/1957 | |
| GB | 2 115 929 | 9/1983 | |
| GB | 2115929 A | * 9/1983 | ........... G01B/07/10 |
| JP | 10-38644 | 2/1998 | |

OTHER PUBLICATIONS

Note: An English language abstract of the above Japanese citation is provided to serve as a partial translation thereof.

* cited by examiner

Primary Examiner—Edward Lefkowitz
Assistant Examiner—Corey D Mack
(74) Attorney, Agent, or Firm—Paul A. Guss

(57) ABSTRACT

A float-type flowmeter measures the rate of a fluid flowing upwardly through a tube based on the position of a float movably disposed in the tube and including a magnetic material. A coil is wound around the tube such that the intervals gradually decrease in an axial direction. The coil is excited by an alternating current supplied from an inductance change detector. The inductance change detector detects a change in the inductance of the coil which is caused when the float moves in the axial direction, and generates a voltage. A voltage-to-position (flow rate) converter determines a flow rate from the voltage corresponding to the position of the float.

18 Claims, 17 Drawing Sheets

POSITION MEASURING DEVICE USING CHANGE IN INDUCTANCE OF COIL, FLOAT-TYPE FLOWMETER, AND POSITION MEASURING METHOD

BACKGROUND OF THE INVENTION

1. Field of the Invention

The present invention relates to a position measuring device for measuring a position using a change in the inductance of a coil, which is suitable as a microflowmeter which is capable of measuring a flow rate in, for example, the range from 10 to 100 [ml/min.], or a length measuring unit for measuring a length of a piston rod as it is displaced into or out of a sleeve, a float-type flowmeter, and a position measuring method.

2. Description of the Related Art

There has been a demand in the market for a float-type flowmeter which is capable of electrically, instead of visually, detecting the position of a float in a fluid. This float-type flowmeter is needed in applications where the float position cannot be visually recognized when the fluid is deeply colored, or when the float position is detected for automatically controlling the rate of the fluid.

One conventional float-type flowmeter for electrically detecting the position of a float in a fluid is disclosed, for example, in Japanese laid-open patent publication No. 10-38644.

The disclosed float-type flowmeter has a float whose position is variable depending on the rate of a fluid that flows through a barrel tube. The barrel tube is made of a metal and the float is made of a magnetically permeable material. A primary coil and a secondary coil wound around the barrel tube and the float which serves as a magnetic core, make up a proportional variable differential transformer for electrically detecting directly the position of the float.

The disclosed float-type flowmeter, however, is unable to measure a desired flow rate unless the float has a length greater than the full length of the coils. Also, the proportional variable differential transformer is complex in structure.

A rod having a linear succession of minute magnets, a so-called Magnescale, may be used as a length measuring unit for measuring a length of a piston rod as it is displaced into or out of a sleeve. However, using this kind of length measuring unit is expensive and the circuit arrangement becomes complex.

SUMMARY OF THE INVENTION

It is therefore an object of the present invention to provide a position measuring device which is simple in structure, low in cost, and capable of producing an electric output signal, a float-type flowmeter, and a position measuring method.

A position measuring device, a float-type flowmeter, and a position measuring method, according to the present invention, employ a coil which is excited by an alternating current and comprises a conductor wound such that the density of magnetic fluxes generated along the axis gradually differs (decreases or increases) along a longitudinal direction of the coil. The position of a moving element, which includes a magnetic material relatively displaceable along an axial direction of the coil, is measured based on a change in the inductance of the coil which is caused when the moving element moves with respect to the coil.

Specifically, a position measuring device according to the present invention has a coil, a moving element, an inductance change detector, and a position calculator. The coil has a conductor wound such that the density of magnetic fluxes generated differs gradually along an axial direction of the coil. The moving element is made of a magnetic material and is able to move in parallel to the axial direction of the coil. The inductance change detector detects a change in the inductance of the coil which is caused when the moving element is moved while the coil is excited by an alternating current supplied thereto. The position calculator determines the position of the moving element in the axial direction based on the detected change in the inductance of the coil.

With the above arrangement, the coil whose conductor is wound such that the density of magnetic fluxes generated differs gradually along the axial direction is excited by the alternating current, and the moving element of magnetic material is moved in parallel to the axial direction of the excited coil. At this time, the inductance undergoes a greater change when the moving element moves toward a coil region where the density of magnetic fluxes is greater, than when the moving element moves toward a coil region where the density of magnetic fluxes is smaller. Based on the above principle, the position of the moving element in the axial direction is determined.

Therefore, the moving element may have a length smaller than the full length of the coil. The coil is simpler in structure than a differential coil. Further, the position of the moving element can be determined as an electric output signal.

The inductance change detector may comprise an LC oscillating circuit for converting a change in the inductance into a change in an oscillating frequency.

The inductance change detector may comprise an alternating current source for supplying the coil with a constant alternating current having a constant frequency, and a voltmeter for measuring a voltage generated across the coil depending on the inductance thereof when the coil is supplied with the constant alternating current, whereby the change in the inductance can be converted into a change in the voltage by the voltmeter. Alternatively, the inductance change detector may comprise an alternating-current voltage source for supplying the coil with a constant alternating-current voltage having a constant frequency, and an ammeter for measuring a current flowing through the coil depending on the inductance thereof when the coil is supplied with the constant alternating-current voltage, whereby the change in the inductance can be converted into a change in the current by the ammeter.

The coil may comprise a coil having a constant cross-sectional shape in a direction perpendicular to the axial direction, with intervals differing gradually.

The coil may be wound around a rod or a hollow rod having a guide groove in the outer surface which guides the turns of the coil.

Alternatively, the coil may have a constant cross-sectional shape differing gradually in size in a direction perpendicular to the axial direction, with a constant interval. In this case, the turns may be wound closely to each other.

Further, when the coil has a constant cross-sectional shape but decreases gradually in size in a direction perpendicular to the axial direction, the intervals gradually decrease. When the coil has a constant cross-sectional shape but increases gradually in size in a direction perpendicular to the axial direction, the intervals gradually increase. With the above arrangement, the density of magnetic fluxes generated by the coil can abruptly change in the axial direction, resulting in an abrupt change in the inductance of the coil.

The coil may comprise a series-connected coil having a plurality of coils serially connected and comprising respective conductors wound such that the density of magnetic fluxes generated thereby differs gradually along the axial direction.

Since the coil, according to the present invention, has a plurality of coils serially connected, the moving element can move in a range greater than in a single coil.

According to the present invention, there is also provided a float-type flowmeter for measuring a rate of a fluid flowing upwardly through a tube having a vertical axis, based on the position of a float movably disposed in the tube, the float-type flowmeter comprising a coil having a conductor wound around the tube such that the density of magnetic fluxes generated thereby differs gradually along an axial direction of the coil, the tube being made of an electrically nonconductive material, the float containing a magnetic material therein, an inductance change detector for detecting a change in the inductance of the coil which is caused when the float is moved while the coil is excited by an alternating current supplied thereto, and a position calculator for determining the position of the float in the axial direction based on the detected change in the inductance of the coil.

Because the float moves depending on the rate of the fluid flowing through the tube and the inductance of the coil changes as the float moves, the position of the float can be detected electrically. As different positions of the float can be associated with different rates of the fluid in one-to-one correspondence, a detected position of the float can immediately be converted into a corresponding rate of the fluid. The float may have a length smaller than the entire length of the coil. The float-type flowmeter according to the present invention is relatively simple in structure as it does not need to use a proportional variable differential transformer.

A moving position measuring device according to the present invention comprises a rod with a coil having a conductor wound therearound such that the density of magnetic fluxes generated thereby differs gradually along an axial direction of the coil, a hollow shaft made of a magnetic material telescopically movable over the rod, an inductance change detector for detecting a change in the inductance of the coil which is caused when the hollow shaft is moved, and a position calculator for determining the position of the hollow shaft in the axial direction based on the detected change in the inductance of the coil.

The moving position measuring device thus constructed is capable of determining the position of the hollow shaft in the axial direction with a simple arrangement without the need for a Magnescale.

The moving position measuring device may further comprise a plurality of teeth mounted on an end of the rod which is disposed in the hollow shaft, the teeth sliding against an inner wall surface of the hollow shaft for keeping the rod in axial alignment with the hollow shaft when the hollow shaft is telescopically moved over the rod. The rod can thus be held easily in position in the hollow shaft.

The rod may include a magnetic material embedded in at least a central axial region thereof, so that the inductance can change greatly when the hollow shaft moves.

A method of measuring a position according to the present invention comprises the steps of exciting a coil having a conductor wound such that the density of magnetic fluxes generated thereby differs gradually along an axial direction of the coil, with an alternating current, moving a moving element of magnetic material parallel to the axial direction of the coil, detecting a change in the inductance of the coil which is caused when the moving element is moved, and determining the position of the moving element in the axial direction based on the detected change in the inductance of the coil.

The above method can be carried out in connection with a position measuring device, a float-type flowmeter, a length measuring unit, or the like.

The coil may be wound around a rod or a hollow rod having a guide groove in an outer surface thereof with the turns of the conductor of the coil being guided in the guide groove. The coil can thus be manufactured with ease.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
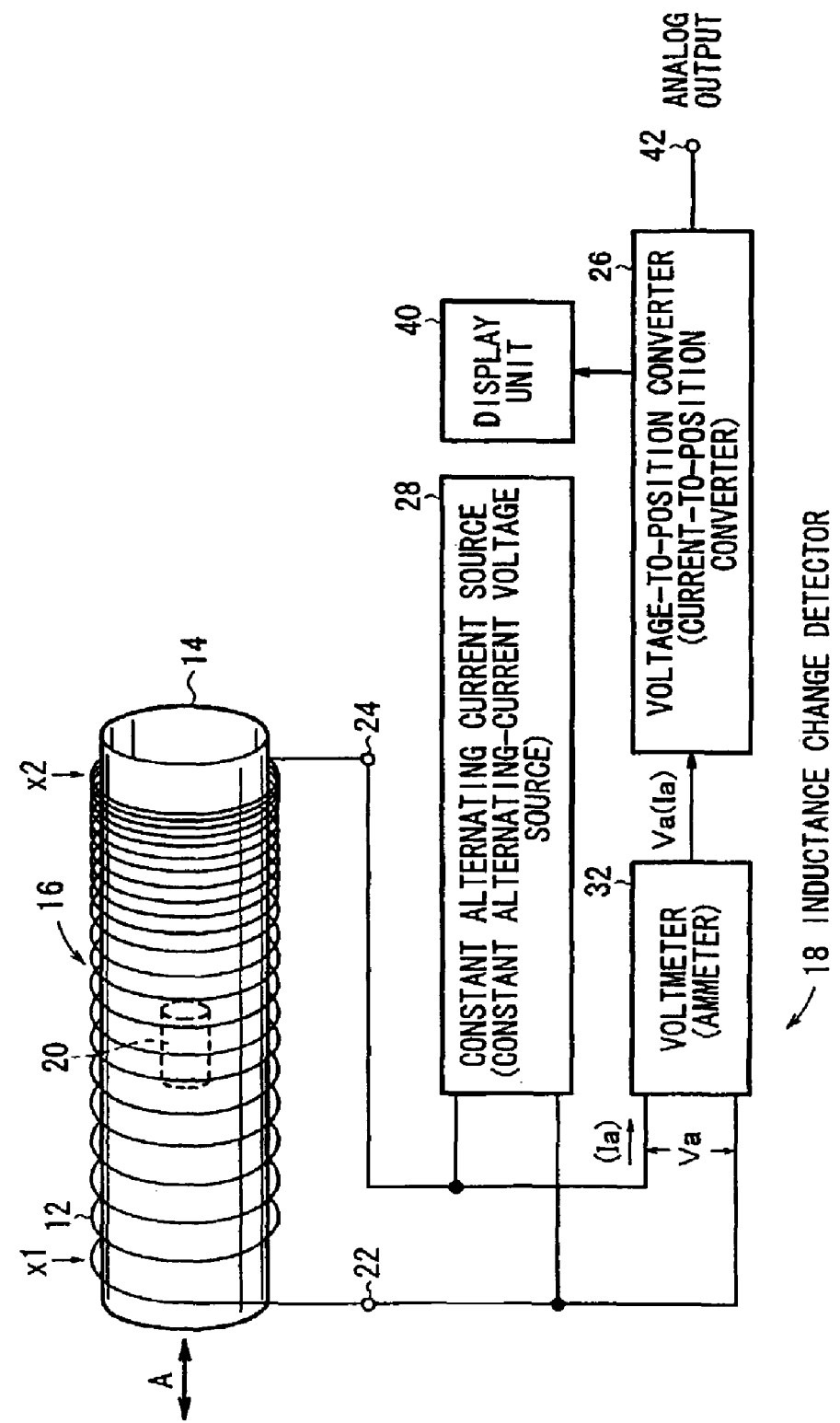
FIG. 1 is a perspective view, partly in block form, of a position measuring device according to an embodiment of the present invention, for measuring a voltage to a coil to determine of a change in the inductance of the coil.

FIG. 1 is illustrative of the principles of a position measuring device 10 according to an embodiment of the present invention.

The position measuring device 10 has a cylindrical coil 16 which is a conductor 12 wound around a hollow rod 14 as a bobbin. The coil 16 is wound such that the density of magnetic fluxes produced by the conductor 12 differs gradually along an axial direction A of the coil 16 when the conductor 12 is supplied with a direct current, i.e., when the conductor 12 is excited by a direct current or by an alternating current.

The coil 16 has terminals 22, 24 on the respective opposite ends of the conductor 12. The cross-sectional shape of the coil 16 perpendicular to the axial direction A, are circular with a constant area. The conductor 12 is wound at intervals which are gradually smaller from a position x1 at one end of the conductor 12 toward a position x2 at the other end. The coil 16 is not limited to the circular cross-sectional shape shown in FIG. 1, but may have any suitable shape, such as a triangular, rectangular, or an elliptical cross-sectional shape.

In order for the intervals of the conductor 12 to be gradually smaller and accurate, the hollow rod 14, which is made of synthetic resin such as fluororesin or the like, has a substantially helical guide groove (not shown) in an outer circumferential surface thereof for guiding the turns of the conductor 12. The conductor 12 in this embodiment is an insulated electric wire such as an enameled copper wire having a diameter of 0.2 [mm]. Further, in this embodiment, the hollow rod 14 has an outside diameter ranging from about 8 to 10 [mm].

Figure 2:
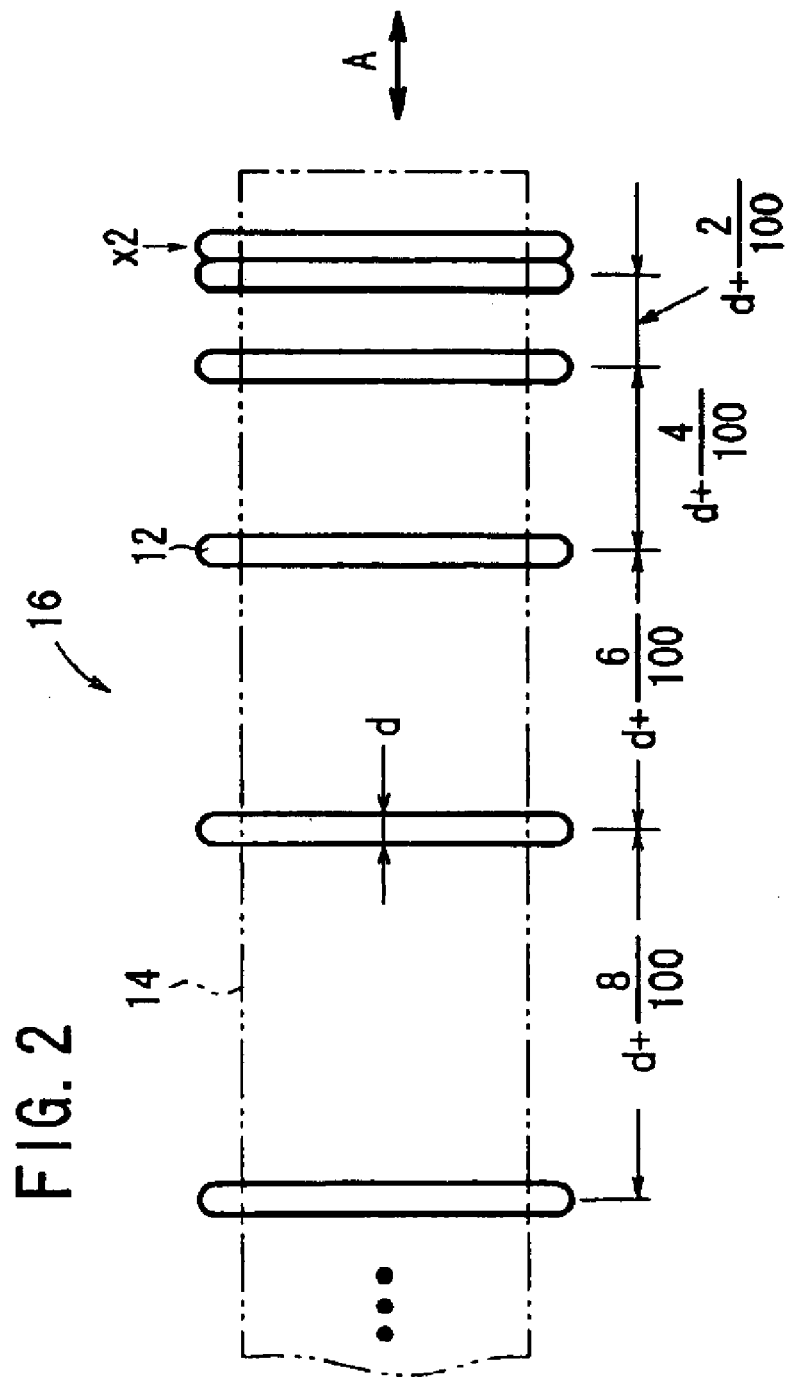
FIG. 2 is a view showing intervals of a coil of the position measuring device.

As schematically shown in an emphasized form in FIG. 2, the first turn of the coil 16 is closely wound at the end position x2 of the terminal 24, and the intervals are gradually greater, by 2/100 [mm] per turn, from the end position x2 toward the end position x1 (see FIG. 1). In FIG. 2, the conductor 12 has a diameter of d. While the turns of the coil 16 are wound by using arithmetic series in FIG. 2, they may alternatively be wound exponentially.

Figure 3:
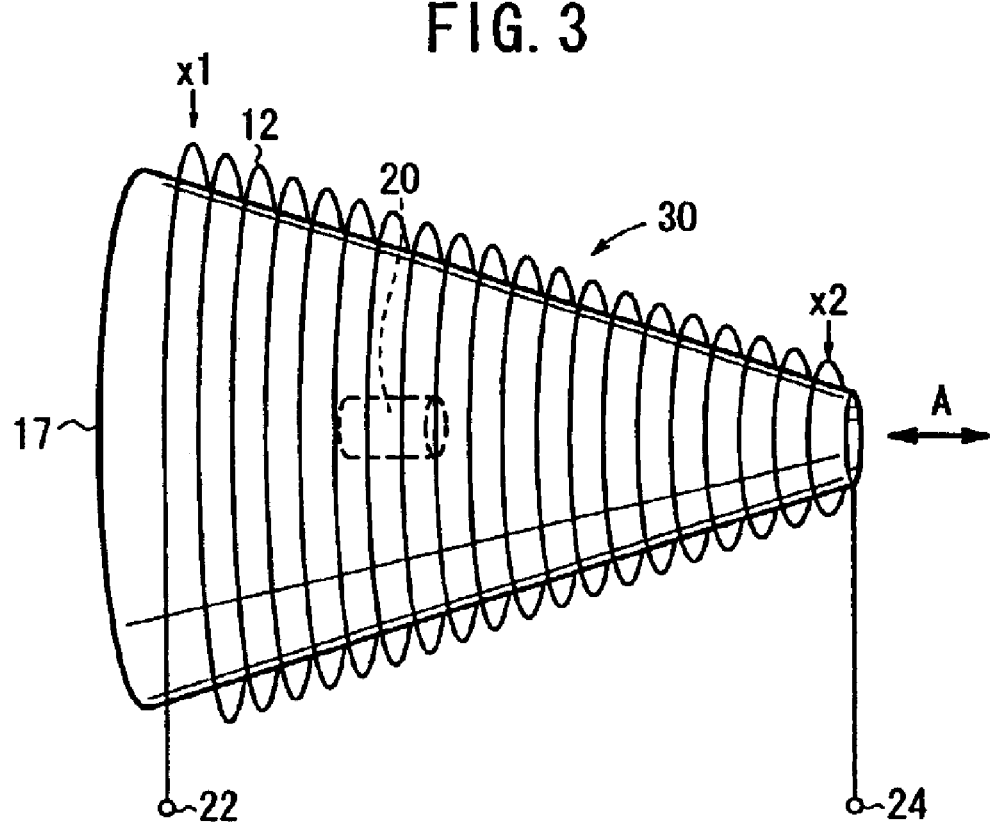
FIG. 3 is a perspective view of another coil which may be used in the position measuring device.

As shown in FIG. 3, the cylindrical coil 16 wound around the hollow rod 14 shown in FIG. 1 may be replaced with a conical coil 30 comprising a conductor 12 wound around a hollow conical bobbin 17 such that the density of magnetic fluxes produced by the conductor 12 differs gradually along an axial direction A of the hollow conical bobbin 17.

The coil 30 is wound with constant intervals. The cross-sectional shape of the coil 30 perpendicular to the axial direction A are similar circles gradually differing in size along the axial direction A. In FIG. 3, the circular cross-sectional shape of the coil 30 increases gradually in size from the end position x2 toward the end position x1. The coil 30 is not limited to the circular cross-sectional shape, but may be of any desired cross-sectional shape. If the coil 30 is wound with intervals, then the conical bobbin 17 should have a guide groove in an outer circumferential surface thereof for guiding the turns of the coil 30. However, the turns of the coil 30 may be closely wound around the conical bobbin 17, without the need for a guide groove, making the cost of the coil 30 low. With the closely wound turns of the coil 30, the density of magnetic fluxes produced by the coil 30 differs gradually along the axial direction A depending on the size of the cross-sectional shape of the coil 30. Since the closely wound turns of the coil 30 are effective in increasing the density of magnetic fluxes produced by the coil 30, the performance required of other components of the position measuring device 10 need not be so efficient.

The conductors 12 of the coils 16 and 30 may be in the form of an electrically conductive coating rather than the electric wire, allowing the hollow rod 14 and the conical bobbin 17 to be made of glass or ceramics.

As shown in FIG. 1, the position measuring device 10 basically comprises the coil 16, a moving element 20 made of a magnetic material which is disposed in the coil 16 and is able to move in parallel to the axial direction A of the coil 16, an inductance change detector 18 connected to the terminals 22, 24 of the coil 16 for detecting a change in the inductance of the coil 16 which is caused when the moving element 20 moves along the axial direction A, and a voltage-to-position converter 26 as a position calculator connected to the inductance change detector 18 for determining the position of the moving element 20 in the axial direction A.

The moving element 20 in this embodiment has a substantially cylindrical shape and is made of ferrite which is a highly magnetic permeable material. The moving element 20 has a length in the axial direction A which is considerably shorter than the entire length of the coil 16, e.g., one-fifth of the entire length of the coil 16. The moving element 20 may be positioned outside of the coil 16, rather than inside of the coil 16.

The inductance change detector 18 comprises a constant alternating current source 28 for supplying a constant alternating current having a constant frequency to the coil 16 through the terminals 22, 24, and a voltmeter 32 for measuring a voltage Va generated across the coil 16 depending on the inductance of the coil 16 when the coil 16 is excited by the constant alternating current supplied to the coil 16. The voltage Va is determined by multiplying the impedance of the coil 16 by the constant alternating current flowing through the coil 16.

The voltage-to-position converter 26 comprises a microcomputer, for example. Specifically, the microcomputer has a CPU (Central Processing Unit) having controlling, calculating, and judging functions, a ROM (Read Only Memory) for storing programs, etc., an EEPROM (Electrically Erasable Programmable ROM) for storing data that are electrically erasable, a RAM (Random Access Memory), input/output interface for an A/D converter and a D/A converter, a clock, a counter, a timer, etc.

As the moving element 20 of ferrite moves from the end position x1, where the coil 16 is wound at a lower density, toward the end position x2, where the turns of the coil 16 are wound at a higher density, the concentration of magnetic fluxes (i.e., the magnetic flux density) generated by the coil 16 increases. Therefore, the inductance of the coil 16 tends to increase as intervals decrease. Consequently, the voltage Va generated across the coil 16 depending on the inductance thereof increases in proportion to the change in the inductance.

Figure 4:
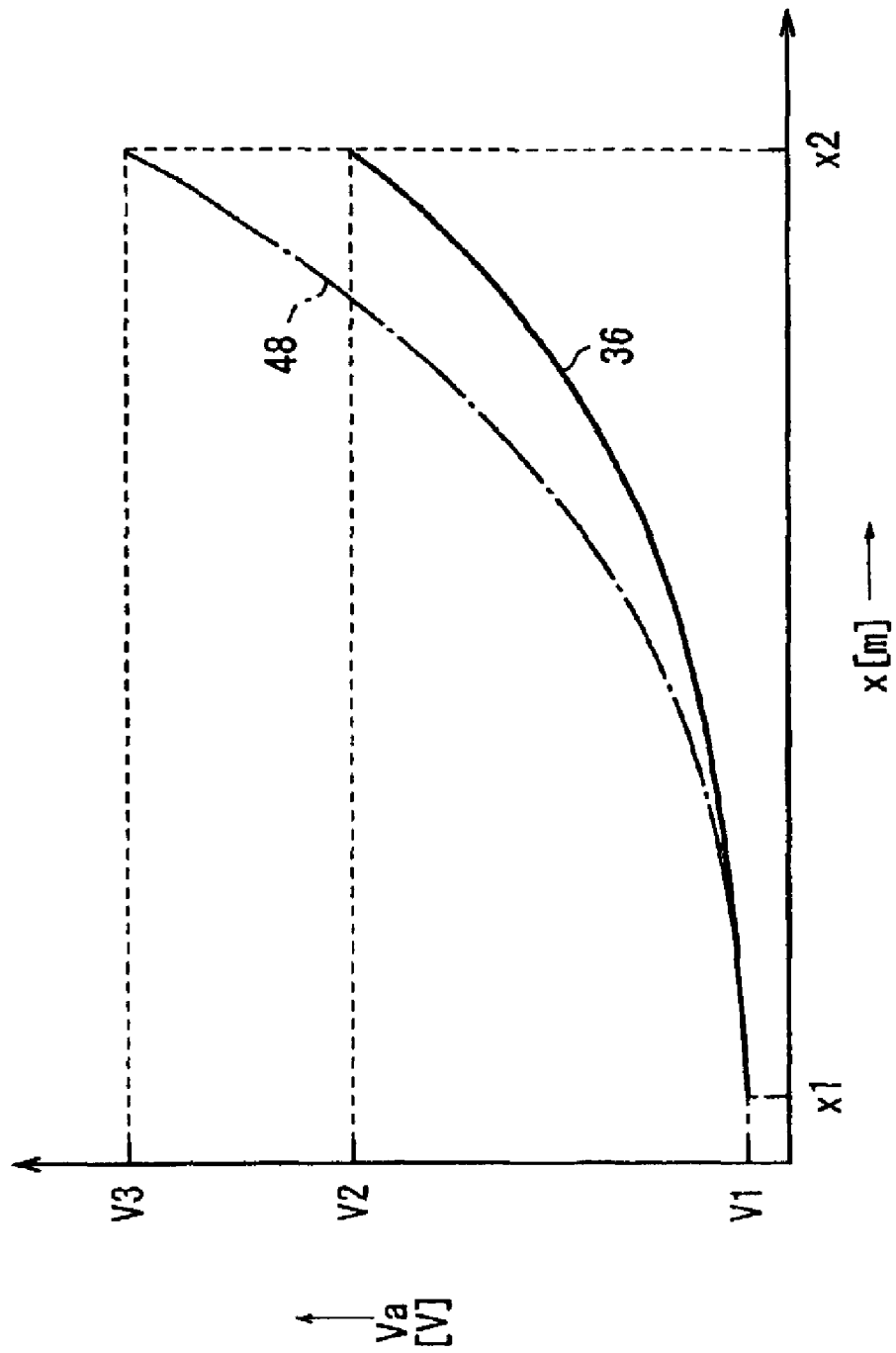
FIG. 4 is a diagram showing how a voltage varies (corresponding to how an inductance varies) depending on the axial position of a moving element.

In FIG. 4, the solid-line curve represents voltage-change characteristics 36 of the voltage Va generated from the inductance of the coil 16, as it changes from a voltage V1 to a voltage V2. The voltage generated across the conical coil 30 shown in FIG. 3 also changes according to the solid-line curve of voltage-change characteristics 36.

As can be seen from the solid-line curve, as the moving element 20 moves a distance x [m] from the end position x1 toward the end position x2 along the axial direction A, the rate of change of the voltage Va [V] (the voltage divided by the unit moving distance of the moving element 20) increases.

A memory such as the EEPROM of the voltage-to-position converter 26, stores the voltage-change characteristics 36 as a table or a calculating formula. The CPU of the voltage-to-position converter 26 refers to the table of the voltage-change characteristics 36 or uses the calculating formula of the voltage-change characteristics 36 to determine the position x of the moving element 20 based on the voltage Va which is inputted from the voltmeter 32.

The voltage-change characteristics 36 of the voltage Va may possibly change due to aging. Therefore, upon elapse of a certain period of time, the voltage-change characteristics 36 of the voltage Va are learned (measured), and the contents of the memory such as the EEPROM of the voltage-to-position converter 26, are updated to the learned voltage-change characteristics 36. In this way, the position x of the moving element 20 can be measured with high accuracy.

The measured position of the moving element 20 is displayed on a display unit 40 such as a liquid crystal display panel or the like by the voltage-to-position converter 26, and is also outputted as an analog or digital signal to an output terminal 42.

With the position measuring device 10 shown in FIG. 1, as described above, the length of the moving element 20 is smaller than the entire length of the coil 16. As the position measuring device 10 does not use a proportional variable differential transformer, the arrangement is relatively simple. As a result, the position measuring device 10 is low in cost and capable of producing a highly accurate electric output signal.

The inductance change detector 18 shown in FIG. 1 has the constant alternating current source 28 for energizing the coil 16 with a constant alternating current. However, the inductance change detector 18 may energize the coil 16 with a constant alternating-current voltage. Specifically, as indicated in parenthesis in FIG. 1, the constant alternating current source 28 may be replaced with a constant alternating-current voltage source for applying a constant alternating-current voltage to the coil 16, the voltmeter 32 with an ammeter for measuring a current Ia flowing through the coil 16 depending on the inductance thereof under the constant alternating-current voltage applied to the coil 16, and the voltage-to-position converter 26 with a current-to-position converter for converting a change in the inductance of the coil 16 into a change in the current Ia.

Figure 5:
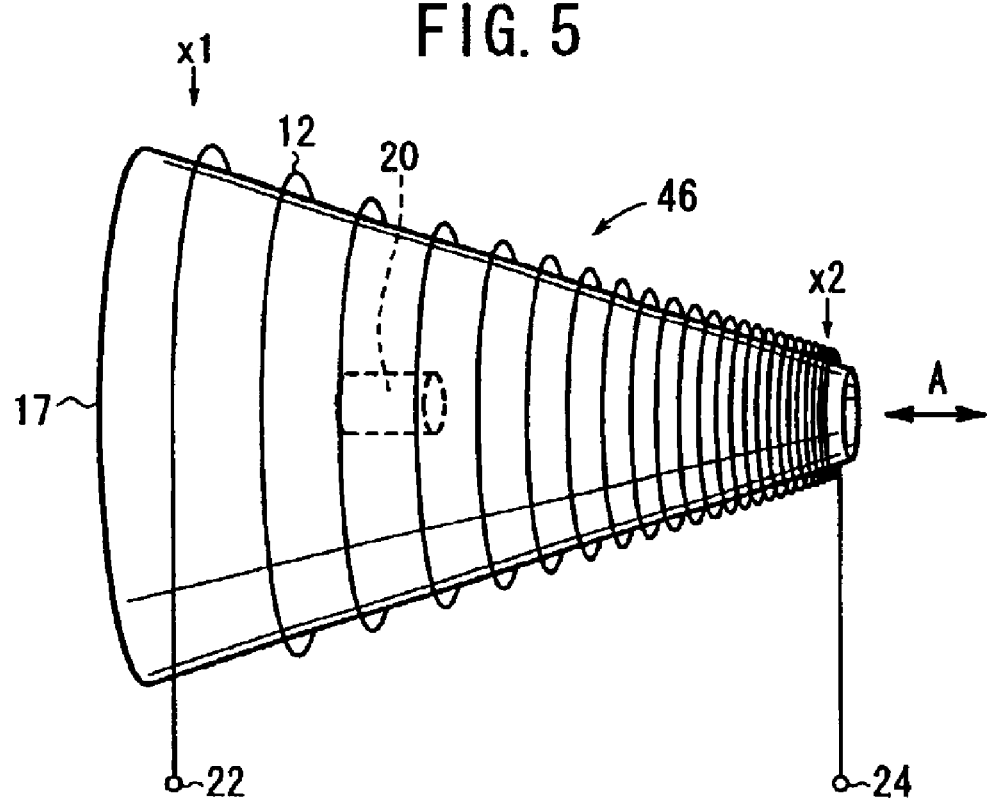
FIG. 5 is a perspective view of still another coil which may be used in the position measuring device.

FIG. 5 shows still another coil 46 for making the voltage-change characteristics 36 steeper. The coil 46, which is of a conical shape, has a succession of turns whose intervals are gradually smaller from the end position x1 toward the end position x2 as the circular cross-sectional shapes of the coil 46 perpendicular to the axial direction A are gradually smaller in size. Stated otherwise, as the circular cross-sectional shapes of the coil 46 are gradually larger in size, the intervals of the coil 46 are gradually larger.

As the moving element 20 moves from the end position x1 toward the end position x2, the concentration of magnetic fluxes (i.e., the magnetic flux density) generated by the coil 46 increases sharply. Therefore, the inductance of the coil 46 tends to increase sharply as the intervals decrease. In FIG. 4, the dot-and-dash-line curve represents voltage-change characteristics 48 showing the voltage Va generated across the coil 46 as it changes from the voltage V1 to the voltage V3. Using the coil 46, the position of the moving element 20 in the axial direction A can be detected with higher accuracy.

Figure 6:
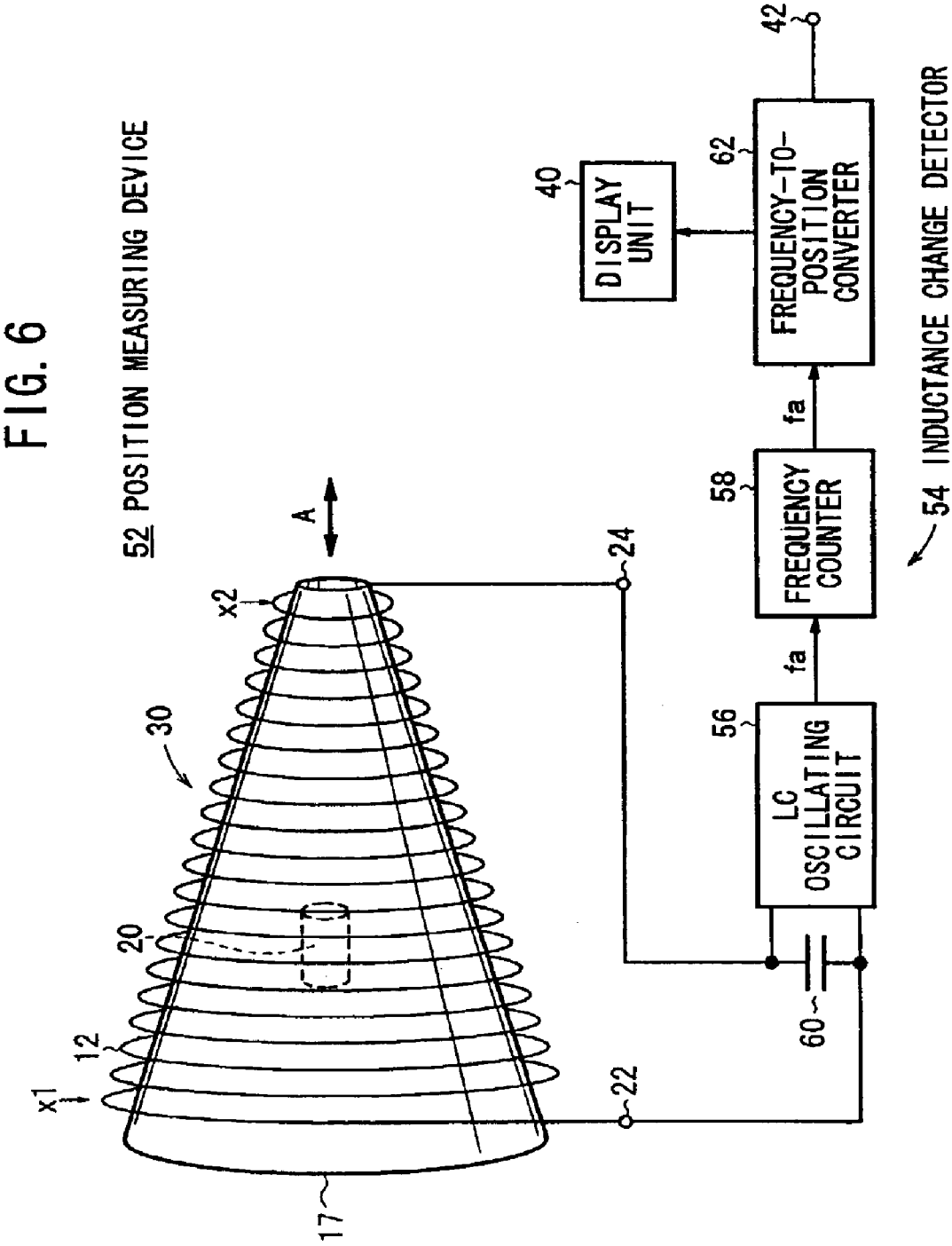
FIG. 6 is a perspective view, partly in block form, of a position measuring device according to another embodiment of the present invention, for measuring a change in the inductance of a coil as a frequency.

FIG. 6 shows an arrangement in principle of a position measuring device 52 according to another embodiment of the present invention.

As shown in FIG. 6, the position measuring device 52 incorporates the coil 30 shown in FIG. 3. However, the position measuring device 52 may incorporate the coil 16 shown in FIG. 1 or the coil 46 shown in FIG. 5.

The position measuring device 52 has an inductance change detector 54 comprising a capacitor 60 connected to both ends of the coil 30, an LC circuit made up of the inductance of the coil 30 and the capacitance of a capacitor 60, an LC oscillating circuit 56 connected to the LC circuit, and a frequency counter 58 connected to an output terminal of the LC oscillating circuit 56.

The frequency counter 58 has an output terminal connected to a frequency-to-position converter 62 which comprises a microcomputer. To the frequency-to-position converter 62, there are connected a display unit 40 and an output terminal 42.

The position measuring device 52 thus constructed operates as follows. When the moving element 20 moves in the axial direction A, the inductance of the coil 30 changes, causing a change in the frequency fa of an oscillated signal from the LC oscillating circuit 56. The frequency fa is determined by the inductance of the coil 30 and the capacitance of the capacitor 60. At this time, the coil 30 is excited by an alternating current.

The frequency fa of the oscillated signal from the LC oscillating circuit 56 is detected by the frequency counter 58, and supplied as an oscillating frequency fa to the frequency-to-position converter 62.

Figure 7:
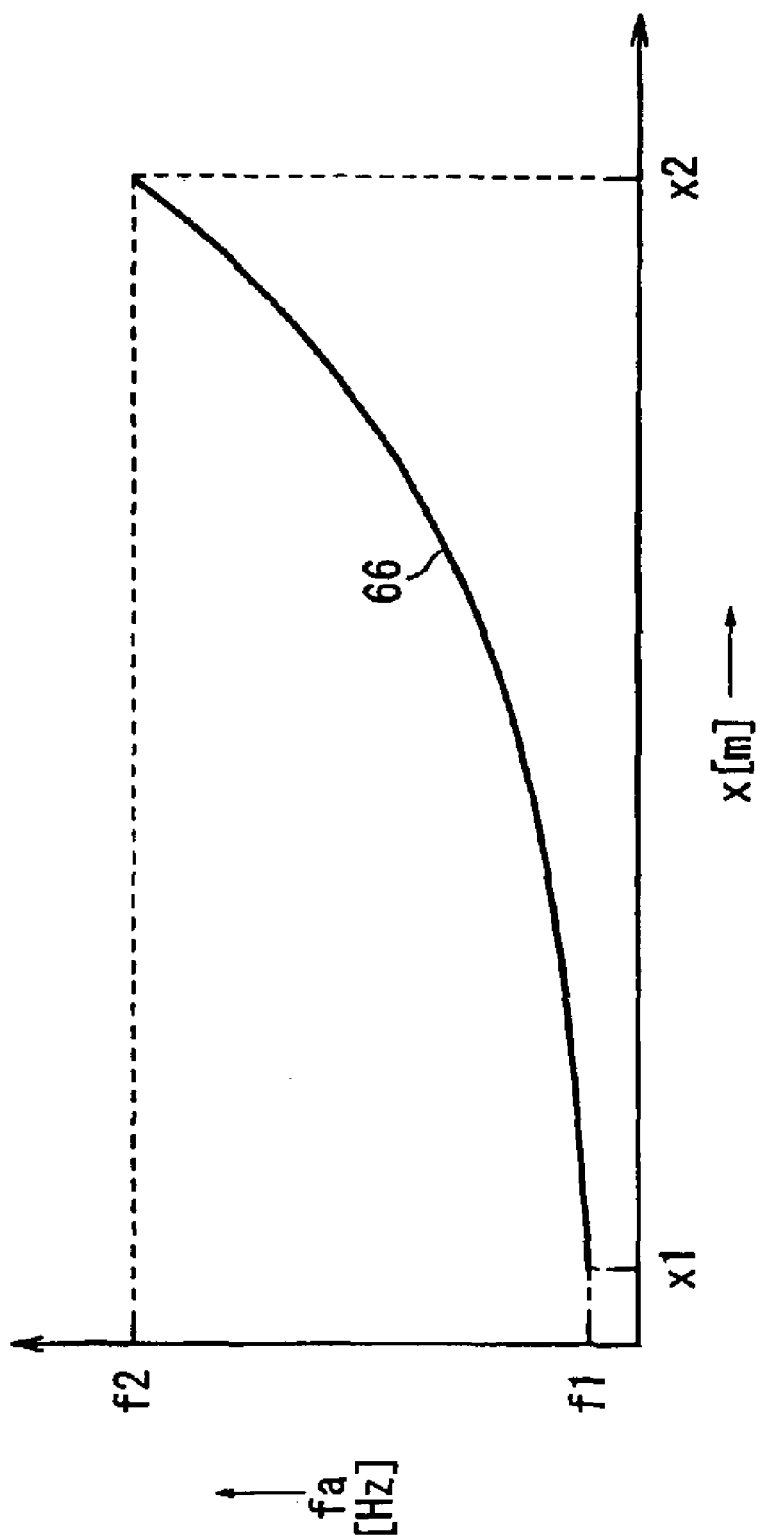
FIG. 7 is a diagram showing how a frequency varies (corresponding to how an inductance varies) depending on the axial position of a moving element.

The frequency-to-position converter 62 refers to a table of frequency-change characteristics 66, shown in FIG. 7, which is stored in its own memory. The frequency-change characteristics 66 represents the relationship between the oscillating frequency fa depending on a change in the inductance of the coil 30 and a position x (a position from position x1 to position x2), and the frequency-to-position converter 62 determines the present position x of the moving element 20 from the table of frequency-change characteristics 66. The determined present position x is displayed on the display unit 40 or supplied to the output terminal 42.

Figure 8:
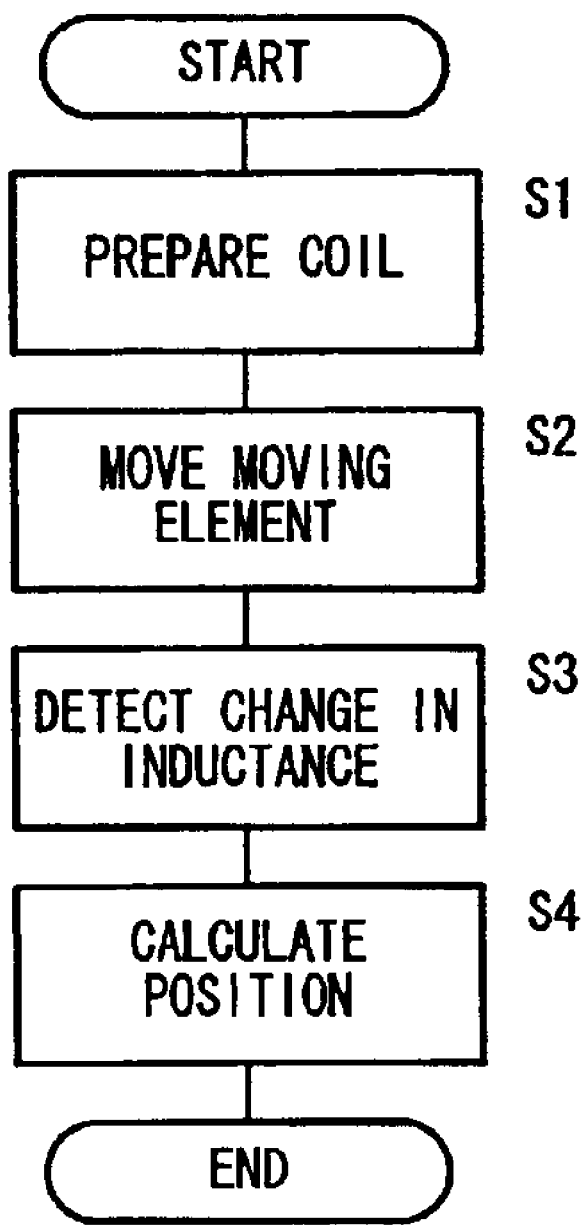
FIG. 8 is a flowchart of an operation sequence illustrative of a position measuring method according to the present invention.

A position measuring method is carried out by the position measuring devices 10, 52 shown FIGS. 1 and 6 as follows. As shown in FIG. 8, the coil 16, 30 or 46 comprising the conductor 12, wound such that the density of magnetic fluxes produced by the conductor 12 differs gradually along the axial direction A, is prepared in step S1.

Then, the moving element 20 of magnetic material is moved in parallel to the axial direction A of the coil 16, 30 or 46 and then stopped, if necessary, in step S2.

A change in the inductance of the coil 16, 30 or 46, caused when the moving element 20 is moved, is detected in step S3. Based on the detected change in the inductance, the position of the moving element 20 in the axial direction A is calculated in step S4.

The position measuring method described above is capable of measuring the position x with a simple arrangement.

Figure 9:
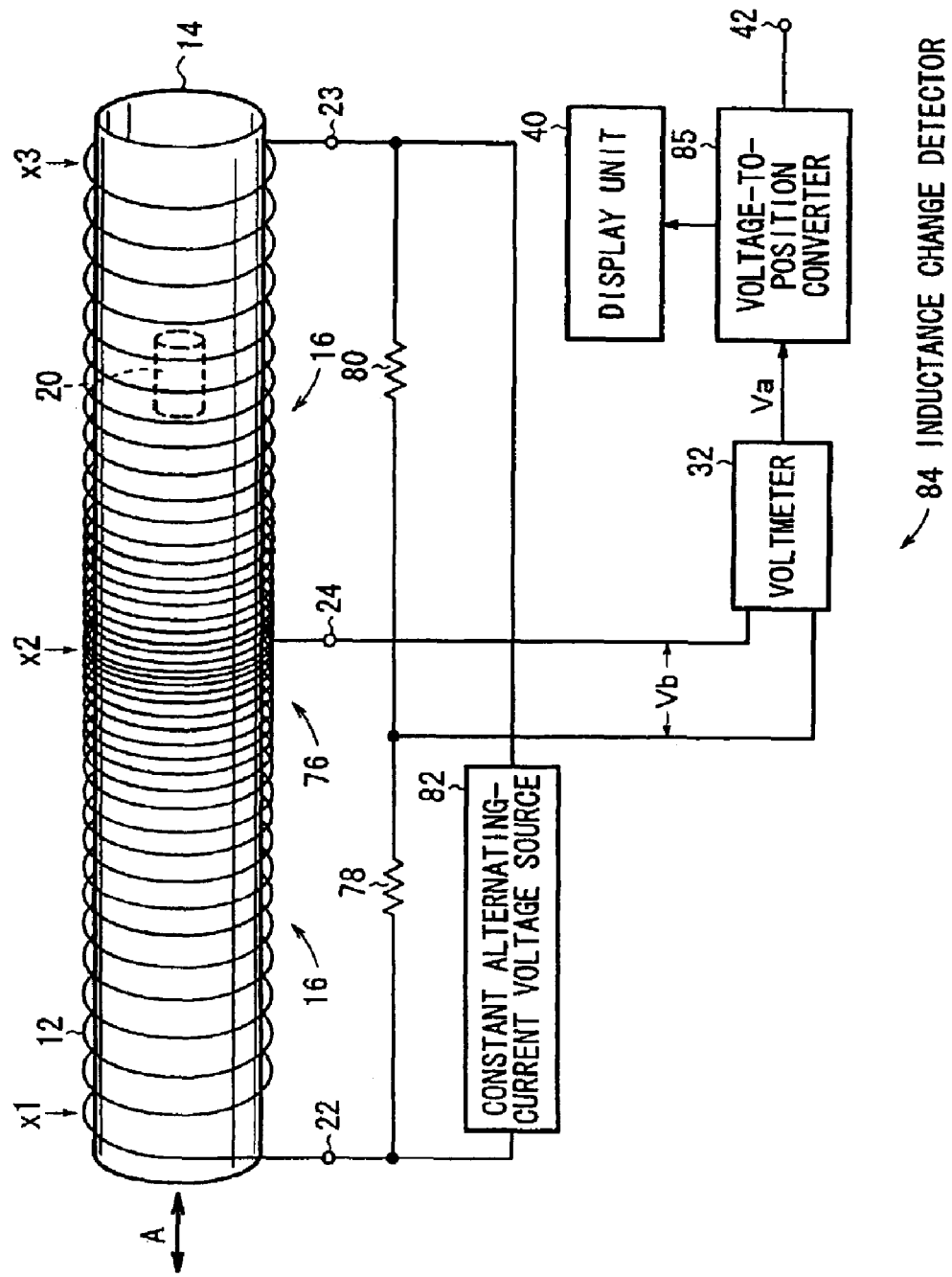
FIG. 9 is a perspective view, partly in block form, of a bridge-type position measuring device according to still another embodiment of the present invention, for measuring a voltage to a coil to determine a change in the inductance of the coil.

FIG. 9 shows an arrangement in principle of a bridge-type position measuring device 72 according to still another embodiment of the present invention.

As shown in FIG. 9, the bridge-type position measuring device 72 has a coil 76 which incorporates two of the coils 16 shown in FIG. 1. The ends of the two coils 16 whose turns are closely wound, are serially connected. The bridge-type position measuring device 72 may alternatively have a coil incorporating two of the coils 30 or the coils 46 shown in FIGS. 3 or 5, which are also serially connected in the same way.

The bridge-type position measuring device 72 has an inductance change detector 84. The inductance change detector 84 comprises a pair of resistors 78, 80 connected in series to each other and having the same resistance, a constant alternating-current voltage source 82 for applying a constant alternating-current voltage having a constant frequency, and a voltmeter 32.

The series-connected resistors 78, 80 are connected in parallel to the opposite terminals 22, 23 of the coil 76, and the constant alternating-current voltage source 82 is connected between the terminals 22, 23. The coils 16 and the resistors 78, 80 are thus connected in a bridge. A voltage Vb generated between a midpoint as a junction between the resistors 78, 80 and a terminal 24 at position x2 where the coils 16 are connected, or a midpoint of the coil 76, is supplied to the voltmeter 32.

The voltmeter 32 has an output terminal connected to a voltage-to-position converter 85 to which there are connected a display unit 40 and an output terminal 42.

The bridge-type position measuring device 72 operates as follows. When the moving element 20 moves along the axial direction A, the inductance of the coil 76 changes, causing a change in the voltage Vb at the midpoint of the coil 76.

The voltmeter 32 detects the voltage Vb and supplies the detected voltage Vb to the voltage-to-position converter 85.

Figure 10:
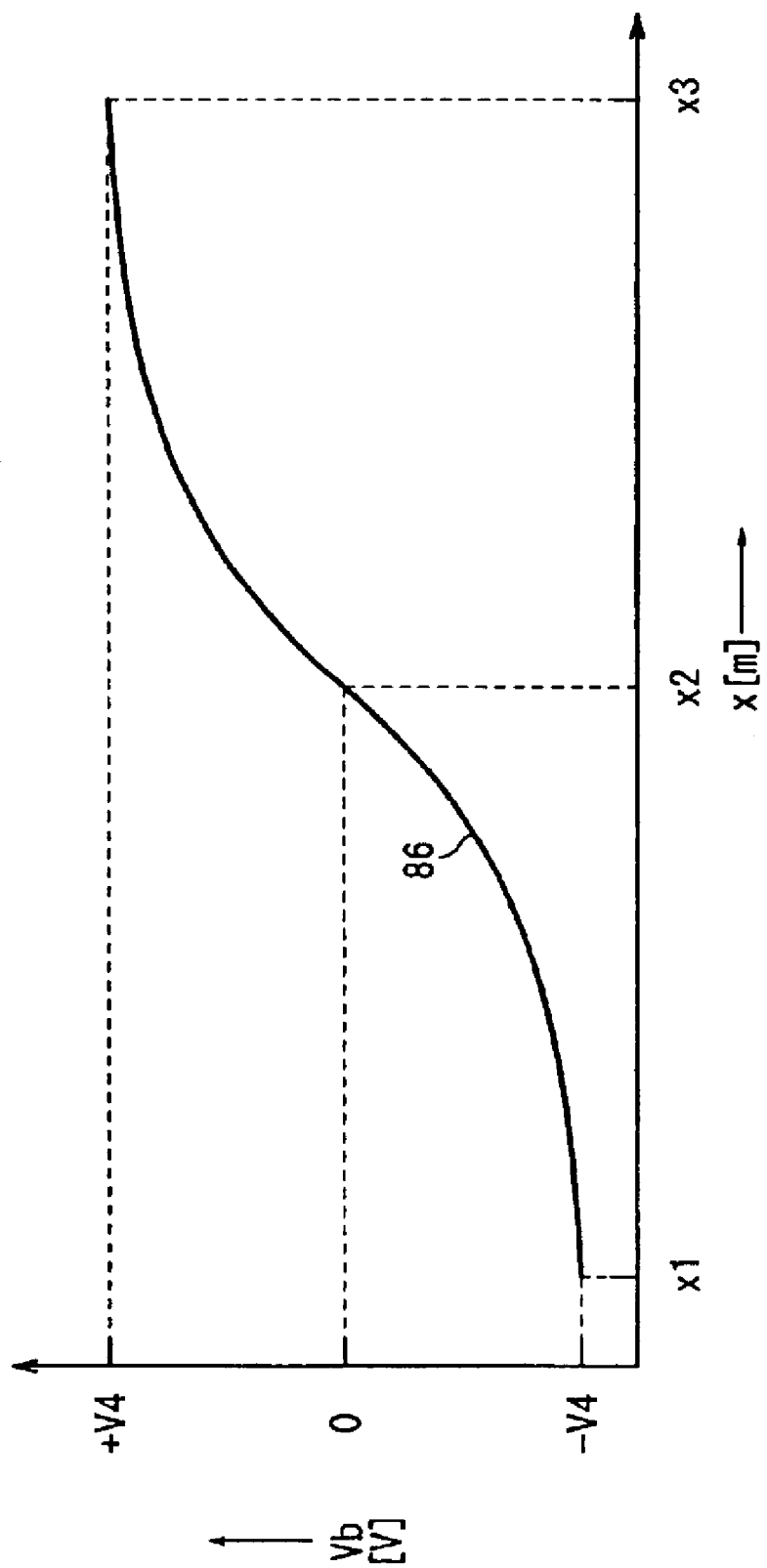
FIG. 10 is a diagram showing how a voltage varies (corresponding to how an inductance varies) depending on the axial position of a moving element in the bridge-type position measuring device shown in FIG. 9.

The voltage-to-position converter 85 refers to a table of frequency-change characteristics 86, shown in FIG. 10, stored in its own memory. The frequency-change characteristics 86 represents the relationship between the voltage Vb (from −V4 [V] to 0 [V] to +V4 [V]) depending on a change in the inductance of the coil 76 and a position x (a position from position x1 to position x2 to position x3), and the voltage-to-position converter 85 determines the present position x of the moving element 20 from the table of frequency-change characteristics 86. The determined present position x is displayed on the display unit 40 or supplied to the output terminal 42.

The bridge-type position measuring device 72 shown in FIG. 9 is capable of measuring the position of the moving element 20 in a longer movement range.

Figure 11:
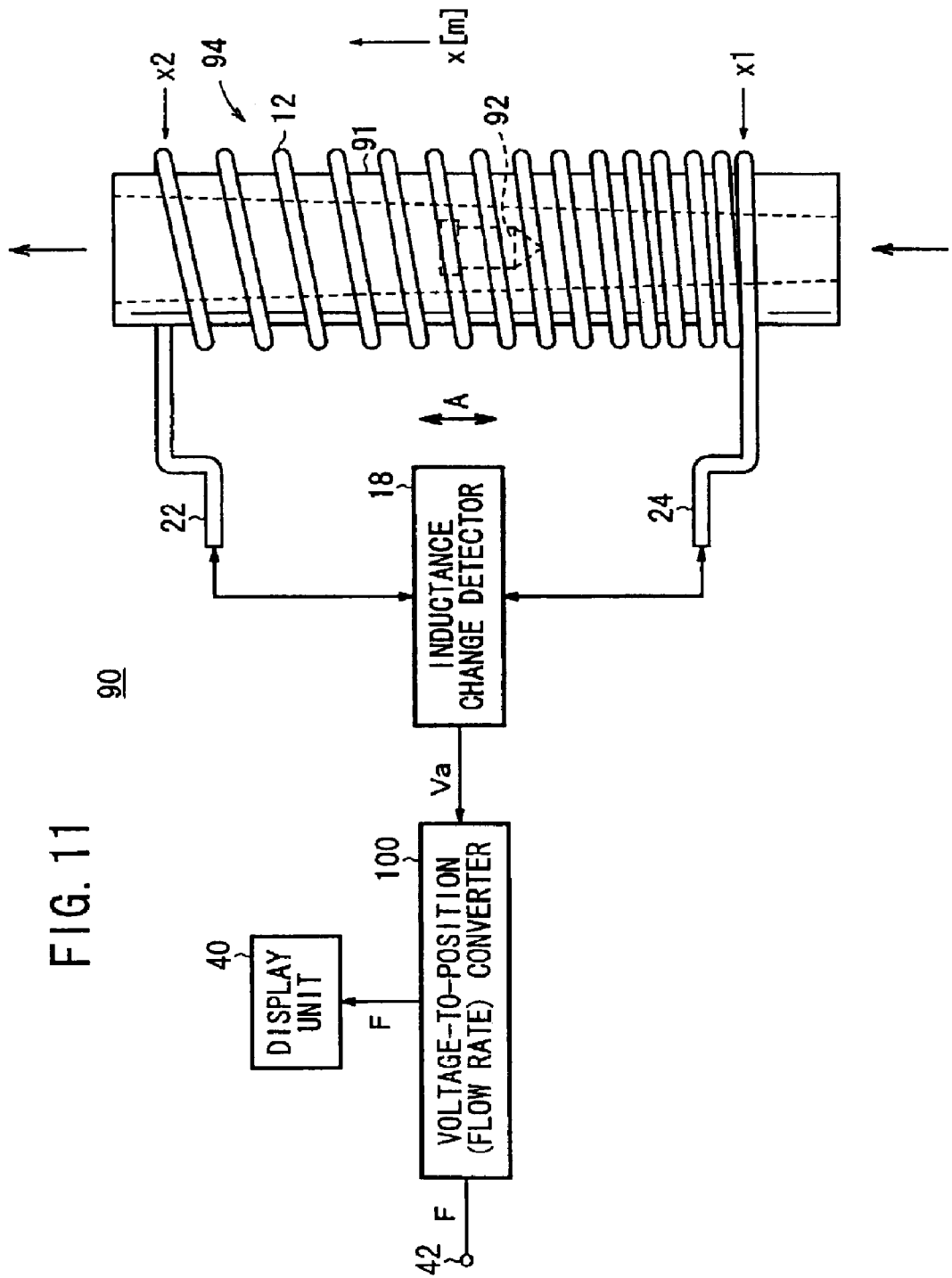
FIG. 11 is an elevational view, partly in block form, of a float-type flowmeter according to yet another embodiment of the present invention.

FIG. 11 shows a float-type flowmeter 90 according to yet another embodiment of the present invention.

As shown in FIG. 11, the float-type flowmeter 90 has a tube 91 having a vertical axis and a float 92 movably disposed in the tube 91. The float-type flowmeter 90 measures the rate of a fluid flowing upwardly through the tube 91 based on the position of the float 92.

The tube 91 is made of a nonconductive material such as glass, fluororesin, or the like. The tube 91 has a hollow space therein which is of a tapered shape (conically shaped) gradually spreading toward the top. By increasing the effective cross-sectional area of the top of the hollow space, the rate of the fluid which can be measured is large even when the length of the tube 91 is short.

A coil 94 comprises a conductor 12 wound around the tube 91 such that the density of magnetic fluxes generated by the coil 94 varies along an axial direction A when a direct current is supplied to the coil 94.

Figure 12:
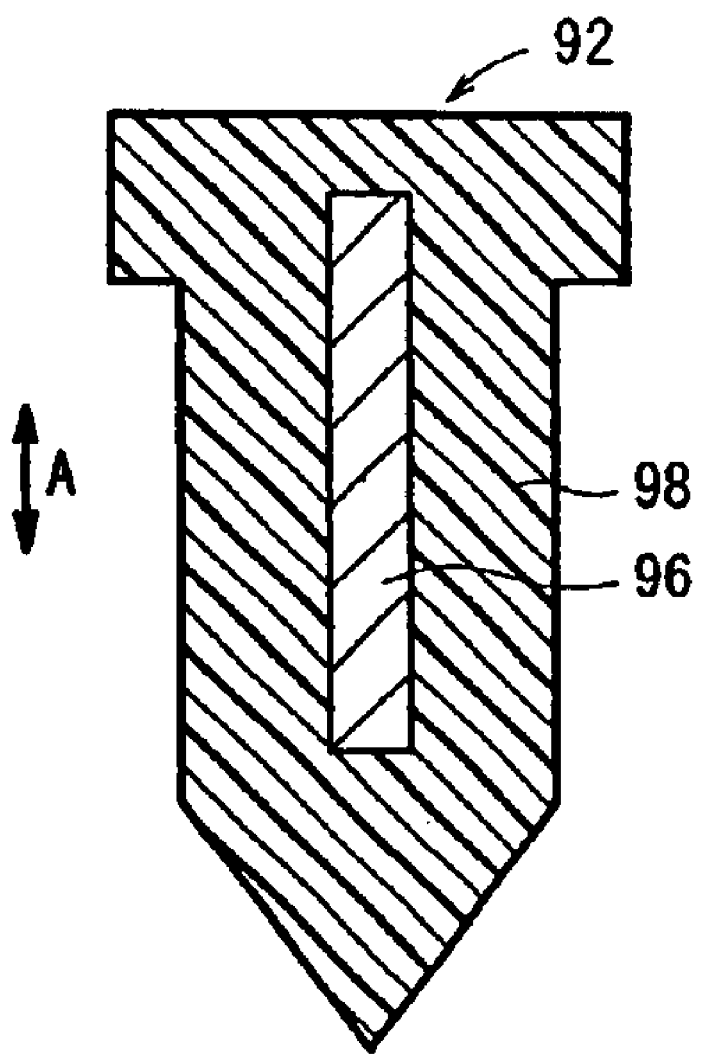
FIG. 12 is a cross-sectional view of a float of the float-type flowmeter.

The float 92, which is functionally equivalent to the moving element 20 shown in FIG. 1, is substantially in the shape of a pointed screw having a cylindrical shank with a cone and a flange on respective ends, as shown in FIG. 12. The float 92 includes a cylindrical (or hollow cylindrical) core 96 made of a magnetically permeable magnetic material such as ferrite or the like covered with an outer casing 98 made of synthetic resin such as fluororesin or the like. It is necessary to include such a magnetic material in the float 92 for concentrating magnetic fluxes. Actually, grooves are provided in the flange of the float 92 for allowing the float 92 to rotate freely to prevent bubbles from attaching. If bubbles are attached to the float 92, it causes an error in measurement.

Between terminals 22, 24 of the coil 94, there is connected a position measuring device comprising an inductance change detector 18, which is identical to the inductance change detector 18 shown in FIG. 1, a voltage-to-position (flow rate) converter 100, a display unit 40, and an output terminal 42.

The inductance change detector 18 detects a change in the inductance which is caused when the float 92 including the magnetic material moves in the axial direction A (vertical direction), and generates a voltage Va depending on the detected change in the inductance.

The voltage-to-position (flow rate) converter 100 refers to a table of voltage-change characteristics (not shown, but similar to the table of the voltage-change characteristics 36 shown in FIG. 4, where the voltage Va is converted into a flow rate F), stored in its own memory. The voltage-change characteristics represents the relationship between the voltage Va depending on a change in the inductance of the coil 94 and the flow rate F corresponding to a position x (a position from position x1 to position x2), and determines the present position x of the float 92, i.e., the flow rate F. The determined flow rate F is displayed on the display unit 40 or supplied to the output terminal 42.

With the float-type flowmeter 90, the float 92 moves in the axial direction A depending on the rate of the fluid flowing through the tube 91, and the inductance of the coil 94 changes as the float 92 moves. Therefore, the position of the float 92, i.e., the flow rate F, can be detected electrically. Since the change in the inductance can be detected, the length of the float 92 may be shorter than the entire length of the coil 94. As the float-type flowmeter 90 needs no proportional variable differential transformer, it is relatively simple in arrangement.

The float-type flowmeter 90 may incorporate the position measuring device 52 shown in FIG. 6.

The float-type flowmeter 90 is suitable for use as a micoroflowmeter which is capable of measuring a flow rate in the range from 10 to 100 [ml/min.], for example. Such a microflowmeter is used in a system for supplying a chemical solution or pure water at an accurate rate to a wafer in the field of semiconductor fabrication technology.

Figure 13:
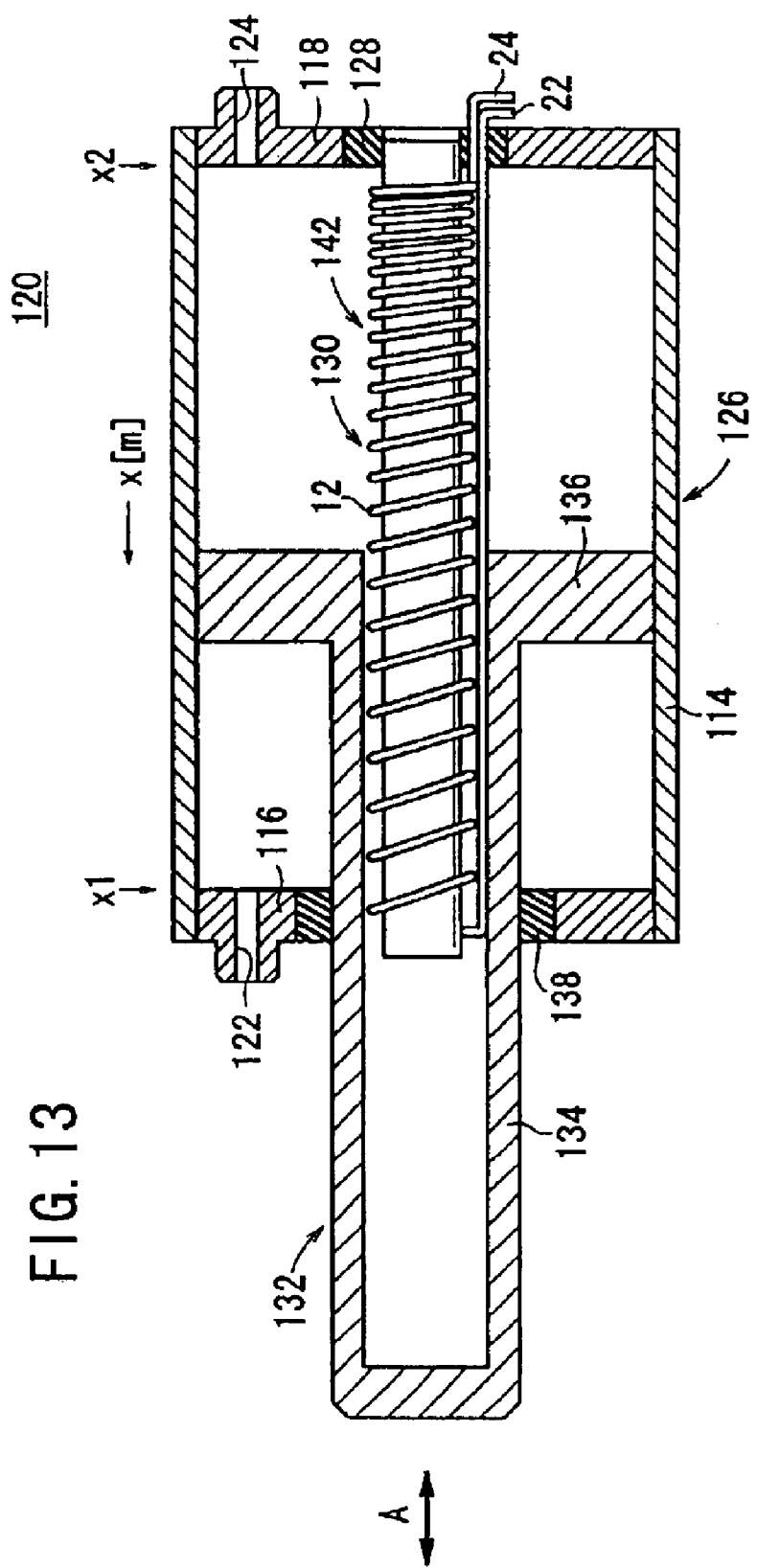
FIG. 13 is a cross-sectional view of a moving position measuring device according to yet still another embodiment of the present invention, for measuring the position of a piston rod.
Figure 14:
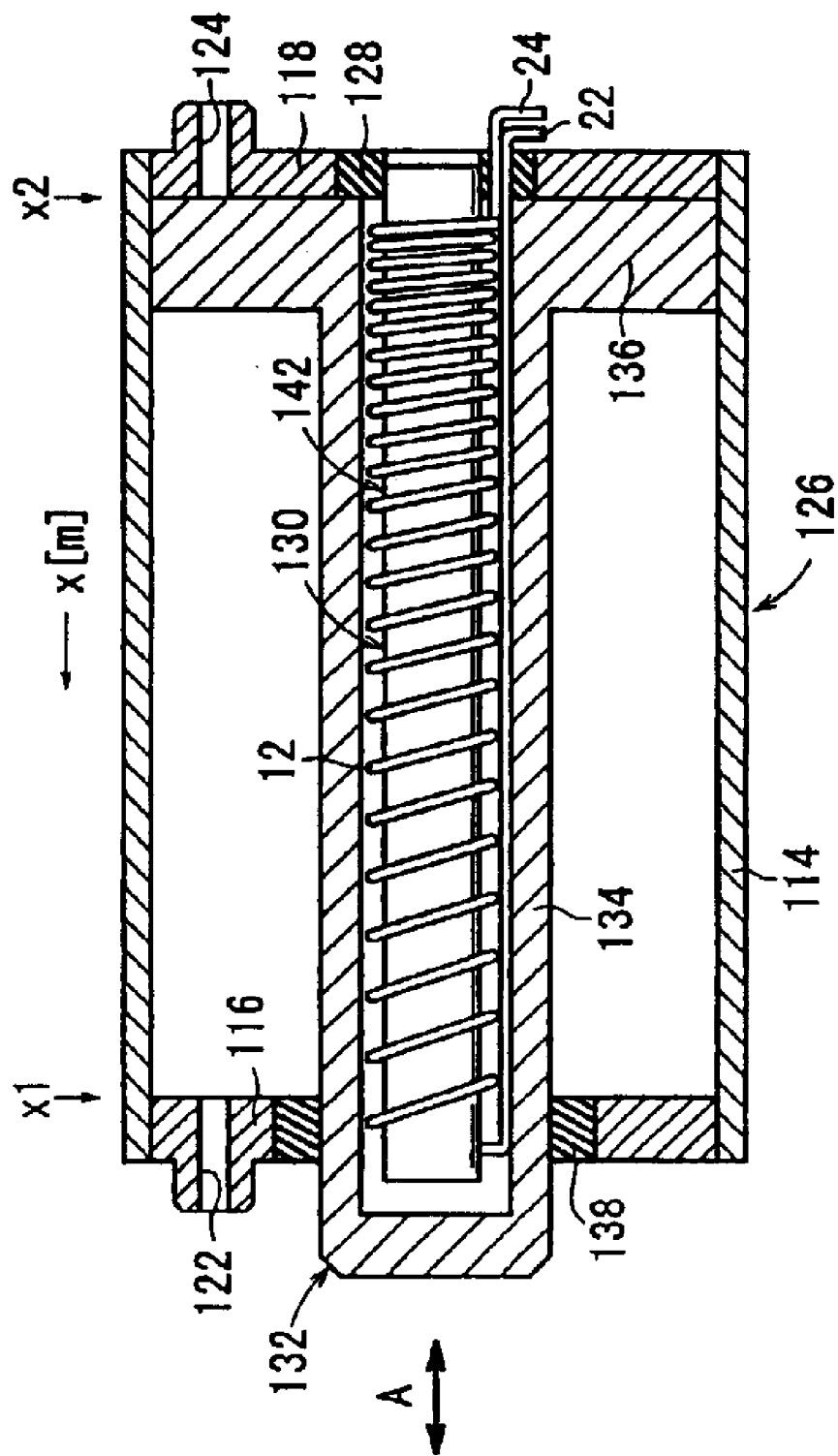
FIG. 14 is a cross-sectional view showing the piston rod fitted in a rod with a coil wound therearound in the moving position measuring device shown in FIG. 13.

FIGS. 13 and 14 show in cross section a moving position measuring device 120 according to yet still another embodiment of the present invention.

As shown in FIGS. 13 and 14, the moving position measuring device 120 has a cylinder tube 126 comprising a cylindrical tube barrel 114 and bottom panels 116, 118 mounted on opposite ends of the cylindrical tube barrel 114 and having fluid inlet/outlet ports 122, 124. The moving position measuring device 120 also has, in addition to the cylinder tube 126, a rod 130 supported in a cantilevered fashion on the bottom panel 118 by a sealing holder 128, and a piston rod 132 having a hollow shaft 134 which can be fitted over the rod 130 in an axial direction A.

The piston rod 132 also has a flange 136 and a hollow shaft 134 having a base at one end and is made of a magnetic material such as iron. The outer circumferential edge of the flange 136 slides against an inner circumferential wall surface of the cylindrical tube barrel 114 in the axial direction A. The outer circumferential surface of hollow shaft 134 slides against an inner wall surface of a ring-shaped seal 138 fitted coaxially with the bottom panel 116.

A coil 142 comprising a conductor 12 is wound around the rod 130 such that the density of magnetic fluxes generated by the coil 142 varies along the axial direction A when a direct current is supplied.

To the terminals 22, 24 of the coil 142 which extend out of the bottom panel 118, there is connected the position measuring device 10 having the inductance change detector 18 which includes the constant alternating current source 28 and the voltmeter 32 as shown in FIG. 1, or the position measuring device 52 having the inductance change detector 54 which includes the LC oscillating circuit 56 as shown in FIG. 6.

When the piston rod 132 of magnetic material slides in the axial direction A against the inner circumferential wall surface of the cylindrical tube barrel 114, or stated otherwise, when the hollow shaft 134 of the piston rod 132 is telescopically moved over the rod 130, the inductance of the coil 142 changes, and the change in the inductance of the coil 142 is detected by the inductance change detector 18, 54. The output voltage Va or the output frequency fa of the inductance change detector 18, 54 is supplied to the voltage-to-position converter 26 or the frequency-to-position converter 62, which determines the position to which the piston rod 132, i.e., the position to which the hollow shaft 134 is moved.

Thus, the moving position measuring device 120 also functions as a length measuring unit for measuring a length of the piston rod 132, i.e., a length of the hollow shaft 134, projecting from the bottom panel 116.

The moving position measuring device 120 is capable of determining the position to which the hollow shaft 134 is moved in the axial direction A, with a simple arrangement which does not employ a Magnescale referred to in the description of the related art.

Figure 15:
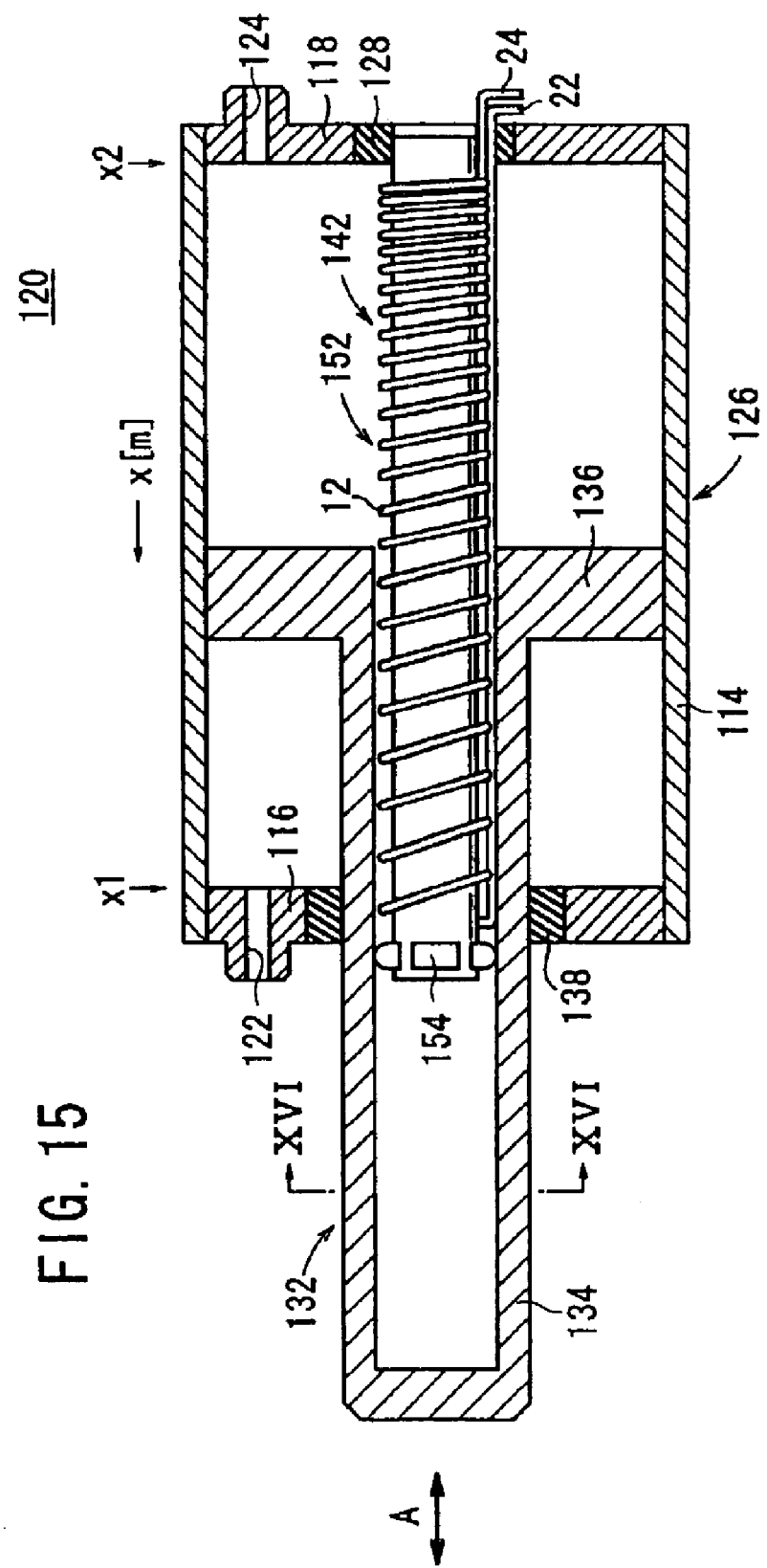
FIG. 15 is a cross-sectional view of a moving position measuring device according to a further embodiment of the present invention, which has another rod with a coil wound therearound.
Figure 16:
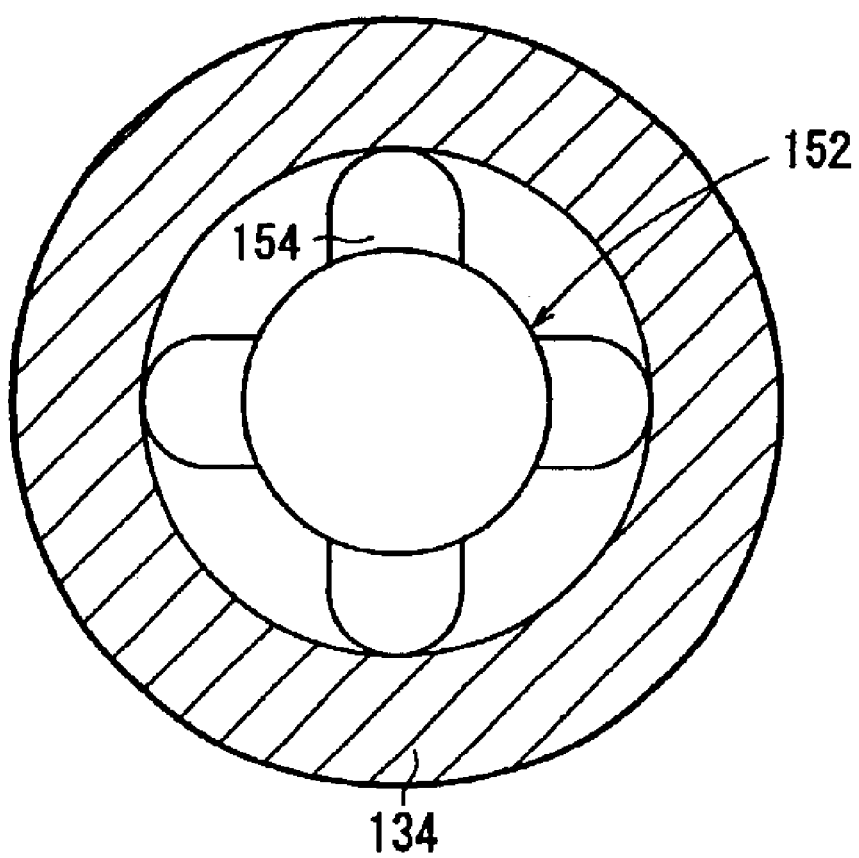
FIG. 16 is a cross-sectional view taken along line XVI—XVI of FIG. 15.

FIG. 15 shows in cross section a moving position measuring device 120 according to a further embodiment of the present invention, and FIG. 16 is a cross-sectional view taken along line XVI—XVI of FIG. 15. As shown in FIGS. 15 and 16, the moving position measuring device 120 according to the further embodiment has a rod 152 having four teeth 154 made of a slippery synthetic resin such as polyacetal, which are angularly spaced at 90° intervals and mounted on a distal end thereof in the hollow shaft 134. The four teeth 154 have radially outward ends which slides against the inner circumferential surface of the hollow shaft 134. The coil 142 is wound around the rod 152.

When the rod 152 is telescopically moved in the hollow shaft 134, the four teeth 154 sliding against the inner circumferential surface of the hollow shaft 134, keep the axis of the rod 152 in alignment with the hollow shaft 134. The cantilevered rod 152 is thus held in axial alignment with the hollow shaft 134 with ease.

Preferably, at least three teeth 154 (angularly spaced at 120° intervals) are provided for keeping the rod 152 in axial alignment with the hollow shaft 134. If an excessive number of teeth 154 are employed, they would increase the frictional resistance and also increase the resistance to a fluid flowing past the teeth 154. Therefore, the number and shape of the teeth 154 should be selected so as to match the size and application of the moving position measuring device 120. Though at least three teeth 154 are preferable, two teeth 154 (angularly spaced at 180° intervals) can also be effective to hold the rod 152 in axial alignment with the hollow shaft 134.

Figure 17:
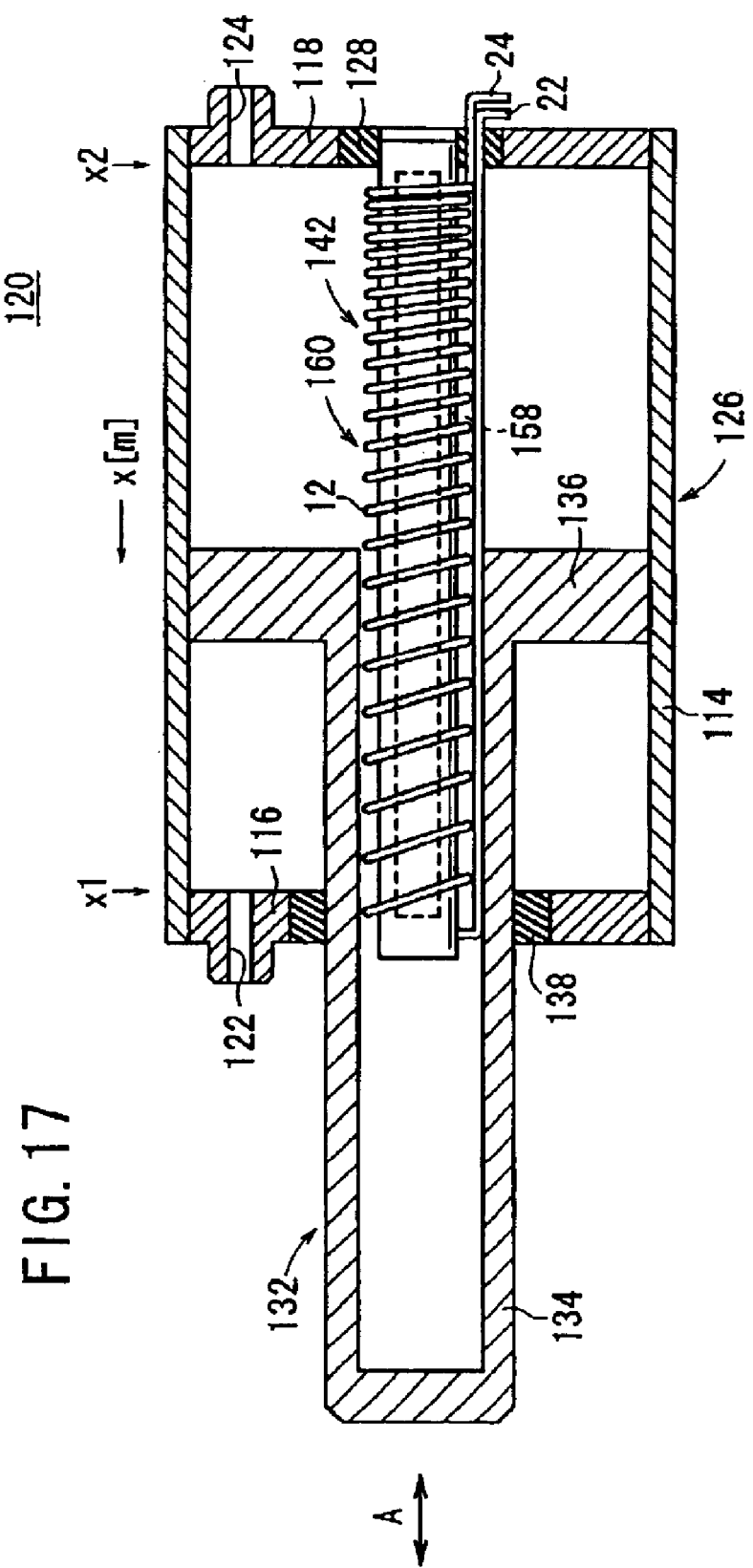
FIG. 17 is a cross-sectional view of a moving position measuring device according to a still further embodiment of the present invention, which has still another rod with a coil wound therearound, the rod having a core bar of magnetic material.

FIG. 17 shows in cross section a moving position measuring device 120 according to a still further embodiment of the present invention. The moving position measuring device 120 shown in FIG. 17 has a rod 160 with a core bar 158 embedded in substantially a central axial region thereof, the core bar 158 being made of a magnetic material such as ferrite. The rod 160 is used in place of the rod 130, 152 shown in FIGS. 13 or 15. The rod 160 with the embedded core bar 158 makes it possible to increase a change in the inductance of the coil 142, which is caused when the rod 160 is moved with respect to the hollow shaft 134. If a change in the inductance of the coil 142 which occurs when the rod 160 is moved is to be the same as the change shown in FIG. 13, then the turns of the coil 142 wound around the rod 160 may be smaller in number or diameter.

The principles of the present invention are also applicable to other devices, e.g., a liquid level meter which incorporates the moving element 20 as a float.

According to the present invention, as described above, a position measuring device, a flowmeter, etc. which are simple in structure and capable of producing an electric output signal can be constructed at a low cost.

Although certain preferred embodiments of the present invention have been shown and described in detail, it should be understood that various changes and modifications may be made therein without departing from the scope of the appended claims.

What is claimed is:

1. A position measuring device comprising:
   a coil wound such that the density of magnetic fluxes generated thereby differs gradually along an axial direction of said coil;
   a moving element of magnetic material movable in parallel to the axial direction of said coil;
   an inductance change detector for detecting a change in the inductance of said coil which is caused when said moving element is moved while said coil is excited by an alternating current supplied thereto; and
   a position calculator for determining the position of said moving element in said axial direction based on the detected change in the inductance of said coils,
   wherein said moving element has an axial length shorter than a length of said coil in said axial direction, and said moving element is capable of being displaceably positioned with respect to said coil such that respective ends of said coil extend beyond both ends of said moving element.

2. A position measuring device according to claim 1, wherein said inductance change detector comprises an LC oscillating circuit for converting a change in said inductance into a change in an oscillating frequency.

3. A position measuring device according to claim 1, wherein said inductance change detector comprises an alternating current source (or an alternating-current voltage source) for supplying said coil with a constant alternating current (or a constant alternating-current voltage) having a constant frequency, and a voltmeter (or an ammeter) for measuring a voltage generated across said coil depending on the inductance thereof (or a current flowing through said coil depending on the inductance thereof) when said coil is supplied with the constant alternating current (or the constant alternating-current voltage), whereby the change in said inductance can be converted into a change in the voltage (or the current) by the voltmeter (or the ammeter).

4. A position measuring device according to claim 1, wherein said coil has a constant cross-sectional shape along a direction perpendicular to said axial direction, and said coil is wound at intervals differing gradually in said axial direction.

5. A position measuring device according to claim 1, wherein said coil has a cross-sectional shape which remains the same in shape, but differs gradually in size, along a direction perpendicular to said axial direction, and said coil is wound at a constant interval in said axial direction.

6. A position measuring device according to claim 1, wherein said coil has a cross-sectional shape which remains the same in shape, but decreases gradually in size, along. a direction perpendicular to said axial direction, and said coil is wound at intervals decreasing gradually in said axial direction.

7. A position measuring device according to claim 1, wherein said coil is a series-connected coil formed by serially connecting a plurality of coils wound such that the density of magnetic fluxes generated thereby differs gradually along the axial direction.

8. A position measuring device according to claim 1, incorporated in a float-type flowmeter for measuring a rate of a fluid flowing upwardly through a tube made of an electrically nonconductive material and having a vertical axis, based on the position of said moving element movably disposed in said tube, wherein said coil is wound around said tube and said moving element comprises a float containing a magnetic material therein.

9. A position measuring device according to claim 1, wherein said moving element has a length in the axial direction that is no more than one-fifth of an entire axial length of said coil.

10. A position measuring device according to claim 1, wherein said moving element is positioned outside of said coil or inside of said coil.

11. A moving position measuring device comprising:
a rod with a coil wound therearound such that the density of magnetic fluxes generated thereby differs gradually along an axial direction of said coil;
a hollow shaft made of a magnetic material telescopically movable over said rod, said hollow shaft comprising a flange at one end thereof, wherein said flange forms a moving element that is movable in parallel to the axial direction of said coil;
an inductance change detector for detecting a change in the inductance of said coil which is caused when said hollow shaft is moved; and
a position calculator for determining the position of said hollow shaft in said axial direction based on the detected change in the inductance of said coil.

12. A moving measuring device according to claim 11, further comprising:
a plurality of teeth mounted on an end of said rod which is disposed in said hollow shaft, said teeth sliding against an inner wall surface of said hollow shaft for keeping said rod in axial alignment with said hollow shaft when said hollow shaft is telescopically moved over said rod.

13. A moving position measuring device according to claim 11, wherein said rod includes a magnetic material embedded in at least a central axial region thereof.

14. A moving position measuring device according to claim 11, wherein said moving element has a length in the axial direction that is no more than one-fifth of an entire axial length of said coil.

15. A method of measuring a position, comprising the steps of:
exciting a coil wound such that the density of magnetic fluxes generated thereby differs gradually along an axial direction of said coil, with an alternating current;
moving a moving element of magnetic material parallel to the axial direction of said coil;
detecting a change in the inductance of said coil which is caused when said moving element is moved; and
determining the position of said moving element in said axial direction based on the detected change in the inductance of said coil,
wherein said moving element has an axial length shorter than a length of said coil in said axial direction, and said moving element is capable of being displaceably positioned with respect to said coil such that respective ends of said coil extend beyond both ends of said moving element.

16. A method according to claim 15, wherein said coil is wound around a rod or a hollow rod having a guide groove defined in an outer surface thereof with said coil being guided in said guide groove.

17. A method according to claim 15, wherein said moving element has a length in the axial direction that is no more than one-fifth of an entire axial length of said coil.

18. A method according to claim 15, wherein said moving element is positioned outside of said coil or inside of said coil.

* * * * *